United States Patent [19]
Harris

[11] Patent Number: 5,160,920
[45] Date of Patent: Nov. 3, 1992

[54] FAIL SAFE DISPLAY FOR SHELF LABELS

[75] Inventor: Richard H. Harris, Raleigh, N.C.

[73] Assignee: International Business Machines Corporation, Armonk, N.Y.

[21] Appl. No.: 623,847

[22] Filed: Dec. 7, 1990

[51] Int. Cl.⁵ .............................................. G09G 3/36
[52] U.S. Cl. ..................................... 340/765; 340/715
[58] Field of Search .............. 340/765, 784, 716, 717, 340/825.73, 715, 794, 796, 797, 795; 359/36; 136/244, 252, 256

[56] References Cited

U.S. PATENT DOCUMENTS

| | | | |
|---|---|---|---|
| 4,095,217 | 6/1978 | Tani et al. | 340/765 |
| 4,311,993 | 1/1982 | Strobel | 340/765 |
| 4,500,880 | 2/1985 | Gomersall et al. | 340/717 |
| 4,734,688 | 3/1988 | Adams | 340/765 |
| 4,758,069 | 7/1988 | Knothe et al. | 340/765 |
| 4,821,291 | 4/1989 | Stevens et al. | 340/825.73 |
| 4,970,503 | 11/1990 | Principe et al. | 340/765 |

Primary Examiner—Alvin E. Oberley
Assistant Examiner—Richard Hjerpe
Attorney, Agent, or Firm—Joscelyn G. Cockburn

[57] ABSTRACT

Described is an electronic shelf label LCD device having a segmented liquid crystal (LC) film disposed on a plurality of segmented and non-segmented photovoltaic cells which provide power for driving the LCD device and electrical signals which are used to indicate malfunctioning LCD segments.

15 Claims, 3 Drawing Sheets

FAIL SAFE DISPLAY FOR SHELF LABELS

BACKGROUND OF THE INVENTION

1. Field of the Invention

The present invention relates to display systems in general and more particularly to electronic price tags which are used on the shelves of a supermarket or the like for displaying information regarding shelved items.

2. Prior Art

The use of electronic price tags for displaying prices and other product information is beginning to gain acceptance in the retail industry. In most retail establishments such as drug stores, supermarkets, etc., items for sale are displayed along a shelf. Information about the various items are provided by the electronic tags which are placed along the shelves holding the items. Changes in item names and/or prices can be done electronically from a computer which is in the store or at a remote site, such as a company's headquarters.

The electronic price tags are attractive to store operators because they ensure accurate price markings at the shelf and save labor costs in making price changes. In other words, the electronic price tags are attractive because of labor savings relating to price changes and improved accuracy over conventional printed label tags.

U.S. Pat. Nos. 4,821,291 and 4,654,514 describe electronic pricing systems in which the electronic shelf labels are fabricated from segmented LCD technology. Electrical power for the display modules is provided by power conductors positioned along the shelves, a battery, or by solar cells placed on the casing of the module.

Even though the segmented LCD technology is inexpensive and as such is the preferred technology for fabricating shelf label modules, it suffers from the problem of being susceptible to display errors. The susceptibility stems from the segments that form the character to be displayed. As is shown in the '514 patent, an alphanumerical character is usually formed from seven segments. If a segment or its connection is damaged, a wrong number could be displayed. For example, an "8" could be displayed as a "6," "0," or a "9." As a result, the reliability of electronic shelf label modules is being questioned. In addition, some governments impose severe penalties for shelf pricing errors. To overcome these problems, there is a need to include error detection and correction mechanisms on the electronic shelf label modules.

U.S. Pat. No. 4,758,069 describes a device and method for determining if the drive circuit of an LCD fails. Each display segment is driven alternately by two circuits. If the circuits alternate at a relatively slow rate and an error occurs in one of the driving circuits, then each segment of the display is driven at a 50% duty cycle and flickers or blinks. The flickering indicates a malfunctioning in the drive circuits. The teachings of this patent only detect failure in drive circuits. However, failures in the display connections and/or in the segments per se are not detected.

U.S. Pat. No. 4,734,688 describes an LCD system in which malfunction in the drive circuit causes one or more segments of the display to flicker. Each segment of the display is driven by a drive circuit and a test circuit. The drive circuit generates a strong drive signal which is applied to a display segment. The test circuit generates a weak checking signal which is superimposed on the strong signal. The weak signal has no discernible effect on the display segment so long as the strong signal is present. However, any defect in the drive circuit or between the drive circuit and the contact to the display segment suppresses the strong signal and allows the weak signal to be discerned in the form of a flicker of the relevant segment electrode. The patent does not detect failures in the display segments.

U.S. Pat. No. 4,311,993 describes an LCD system having circuits which use the capacitive properties of the segments to indicate malfunctioning of the segments.

U.S. Pat. No. 4,095,217 describes an LCD for a calculator.

The display includes an upper glass plate and a lower glass plate which are spaced from each other by a liquid seal. A nematic liquid is poured in the cavity which is formed between the glass plates. Upper and lower sets of transparent electrodes are placed on the surfaces, interfacing the liquid, of the upper and lower glass plates. Power for the calculator is provided by a photovoltaic converter which is positioned on the bottom surface of the lower glass plate to capture light which is incident through the display.

It should be noted that U.S. Pat. No. 4,095,217 sets forth the structure for a conventional LCD. In addition, the patent does not disclose a fail safe feature. Even though the structure appears to work well for its intended purpose, there may be applications for an LCD which does not use a nematic liquid or a LCD which uses a nematic liquid and a fail safe feature. Such a LCD, including fail safe features, is described hereinafter.

SUMMARY OF THE INVENTION

It is one object of the present invention to provide an LCD with a novel structure.

It is another object of the present invention to provide an electronic shelf labeling system using the novel LCD structure.

It is still another object of the present invention to provide fail safe features in said electronic shelf labeling system.

A segmented LCD is energized to transmit light through selected ones of its display segments to segmented photovoltaic cells disposed beneath the LCD. The photovoltaic cells become the background for the segmented LCD. Each segment of the display coact with a separate one of the photovoltaic cells. The voltage that is developed by each photovoltaic cell is proportional to the amount of light which it receives from a related display segment. A feedback circuit arrangement correlates the voltages generated by selected ones of the photovoltaic cells with the drive signal to the corresponding display segment to output signals indicative of the functional state of display segments.

These and other objects and advantages of this invention will be more fully described in the accompanying drawings.

DETAILED DESCRIPTION OF THE PREFERRED EMBODIMENT

Figure 1:
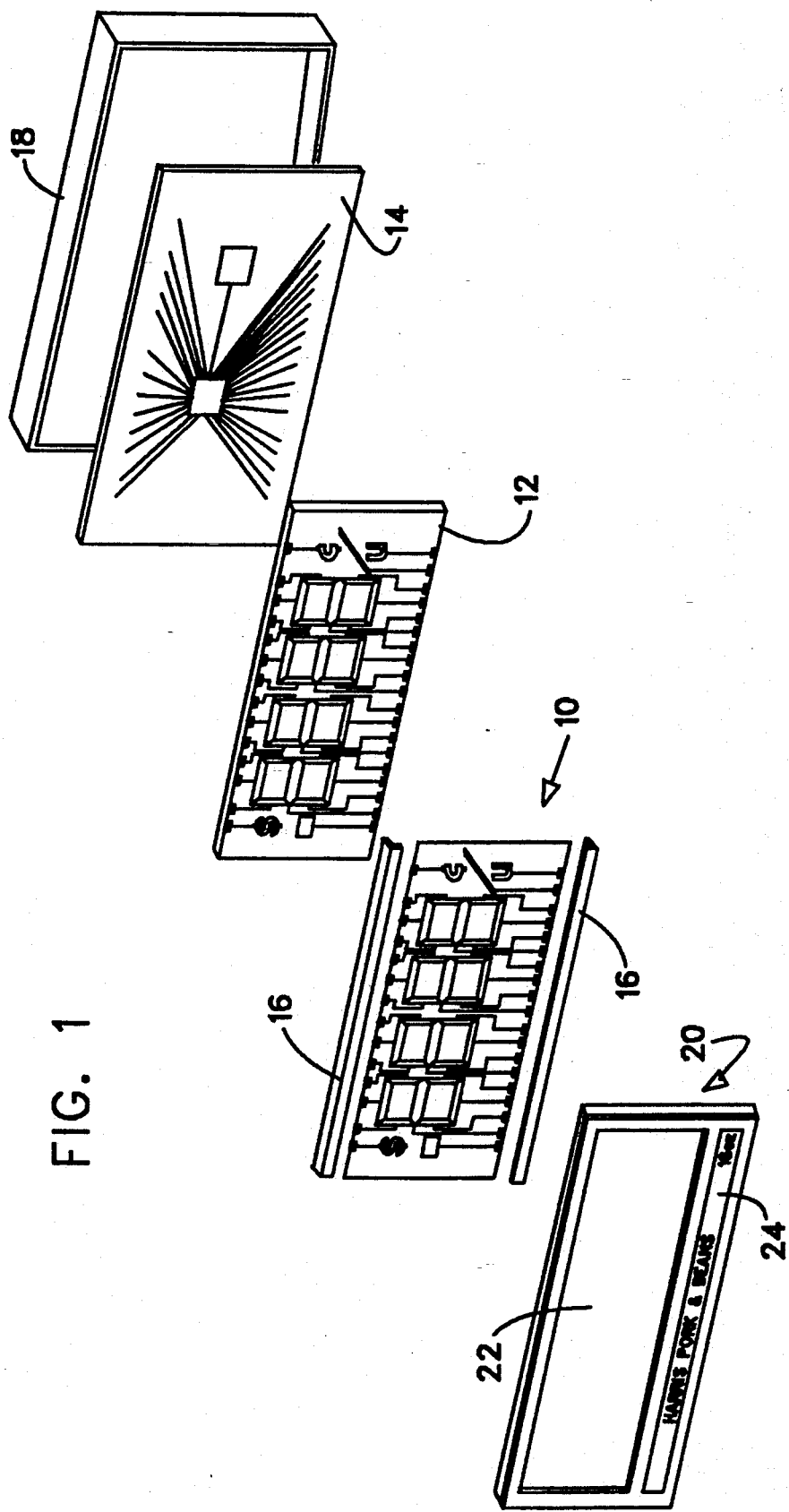
FIG. 1 shows an exploded perspective view of an electronic shelf label system according to the teachings of the present invention.

FIG. 1 shows an exploded perspective view of the improved shelf label system according to the teachings of the present invention. The shelf label system includes liquid crystal display 10, segmented solar cell means 12, printed circuit card 14, elastomer interconnection system 16 and a housing formed by back cover 18 and front cover 20. The printed circuit card 14 carries electronic components (details to be given subsequently), supports the segmented solar cell means and the segmented liquid crystal display 10. The elastomer interconnection system 16 is conductive and distributes electric power and control signals between various components of the electronic shelf label. The named components are pinned together and packaged inside the housing formed by back cover 18 and front cover 20. The viewing window 22 enables a customer to view the display. The printed label 24 is placed on the front cover 20 of the housing and identifies the item whose price is displayed in the display window. The LCD 10 could be a liquid crystal film or conventional LCD that is formed by nematic liquid sandwiched between glass plates which carry electrical conductors. The conventional LCD structure is well known in the prior art. Therefore, a detailed description of its structure will not be given here.

Still referring to FIG. 1, a plurality of geometrical shapes and/or alphanumeric characters are generated in the liquid crystal display 10. Each geometric shape, pattern and/or alphanumeric character is formed from a plurality of display segments. As will be explained subsequently, each segment is controlled to provide the display which a viewer sees through window 22. In FIG. 1, each pattern is formed from seven display segments. It should be noted that this representation is merely illustrative and should not be construed as a limitation on the scope of the present invention. It is within the skill of one skilled in the art to generate a plurality of different shaped patterns using greater or less than seven segments.

Still referring to FIG. 1, each segment is coupled to an electrical conductor which is terminated on pads located in appropriate areas, such as along the edges of the film. The area of the film surrounding the geometric pattern is transparent and provides light which is used for charging the solar cell which is positioned beneath the segmented liquid crystal film. The liquid crystal film has chemical characteristics of scattering light and turning milky (that is non-transparent) when a voltage is not applied to its segment lead. If a voltage is applied to the lead, the segment adopts the opposite state, that is, becomes transparent. The type of chemical films which can be used include the one called nematic-curvilinear-aligned-phase (NCAP) film and is manufactured by Tailiq Corporation. A short description of this film is set forth in EDN, Vol. 33, No. 16A, August 1988.

Still referring to FIG. 1, a plurality of segmented geometric patterns identical to those on the segmented liquid crystal film are generated on segmented solar cell means 12. Each of the segments is connected by electrical conductors to edge connectors which are placed on the edge of the solar cell means 12. As will be explained in more detail subsequently, the light which is transmitted through the liquid crystal segment is converted by the solar cell means to generate electrical power which is used to provide the energy for each shelf label system. In addition, the segments and generated geometrical patterns on the solar cell means are identical to those on the segmented liquid crystal film. Each segment on the segmented solar cell means generates feedback signals which are used to indicate the operability of a segment on the liquid crystal film. Thus, with this feedback system a malfunctioning connection to a display segment on the liquid crystal film, or malfunctioning of the segment itself is easily detected.

When the segmented liquid crystal film is packaged in the housing with the segmented solar cell means 12, the segmented liquid crystal film is in physical contact or close contact with the segmented solar cell means 12. In addition, whatever pattern is formed on the segmented liquid crystal film is replicated on the segmented solar cell means 12.

Figure 2A:
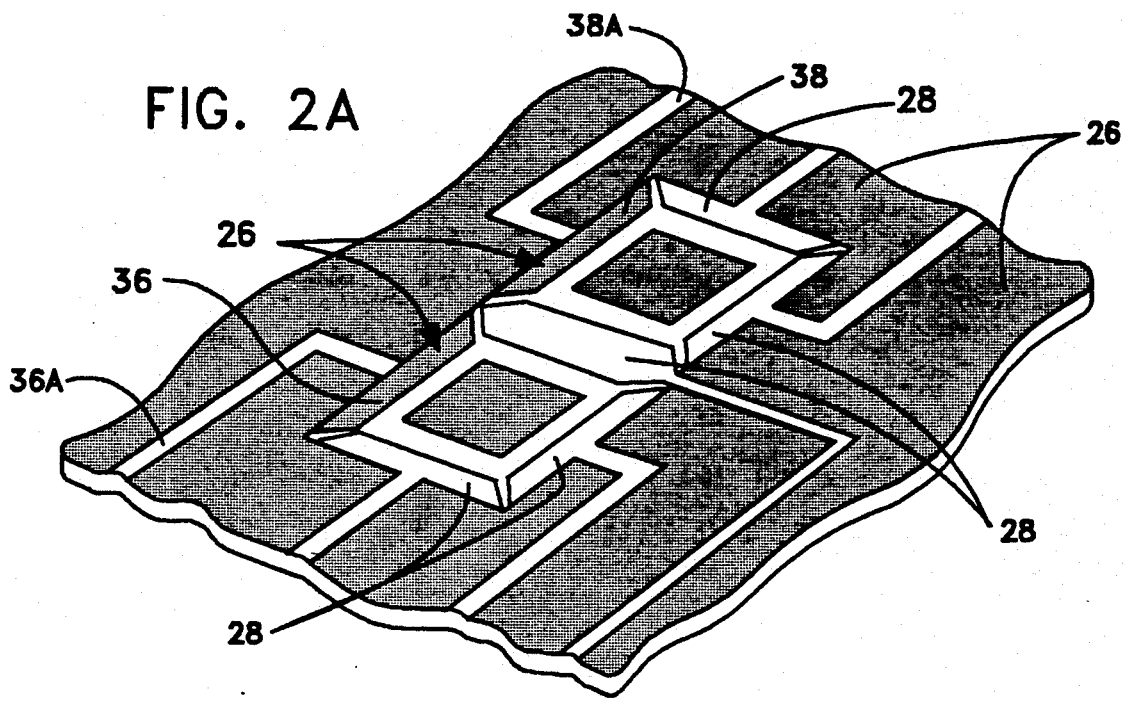
FIGS. 2A and 2B show sections for a numeric segment display.
Figure 2B:
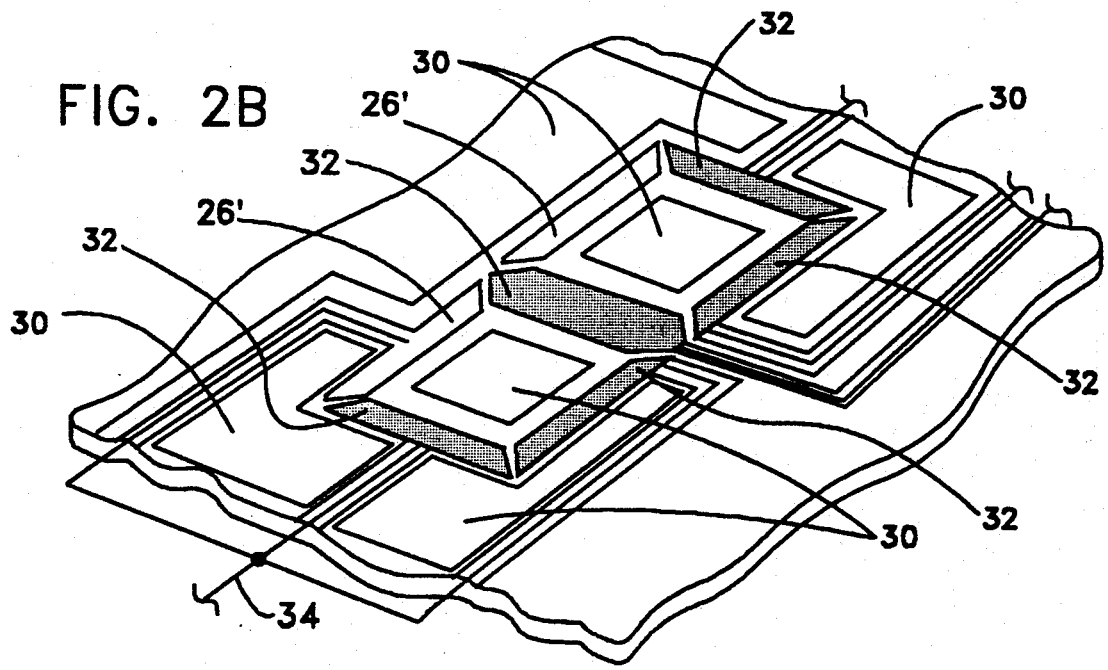

Turning now to FIGS. 2A and 2B, for the moment a portion of the segmented liquid crystal film and the segmented solar cell means 12 are shown as a unified structure. As can be seen from the sketch, the segmented liquid crystal film is on top and the segmented solar cell means 12 is below. The cross hatch areas identified by numeral 26 are transparent and allow light to pass through to the photovoltaic cells below. The non-cross hatch areas identified by numeral 28 (FIG. 2A) are opaque and shade the photovoltaic cells below.

Referring to FIG. 2B, the solar cell means 12 (FIG. 1) is formed from a plurality of individual photovoltaic cells. Each photovoltaic cell is positioned to receive or not receive light from a single segment of the display segments on the liquid crystal film. Thus, in FIG. 2B photovoltaic cells, such as those identified by numeral 30, and photovoltaic cells below transparent segments 26' receive light continuously and generate power continuously. On the other hand, photovoltaic cells such as those below the opaque segments identified by numeral 32 are partially shaded due to the state of the display segments above and as a result receive less light and generate less power than the non-shaded cells. As will be explained subsequently, the power which is generated by each cell is used to indicate the state of the segment.

Still referring to FIG. 2B, photovoltaic leads identified by numeral 34 generate a positive voltage level (+V) while the common photovoltaic lead (not shown) generates a negative voltage level (−V). Because of the shading and the non-shading characteristics of the liquid crystal film, its effect on the photovoltaic cells may be likened to a shutter mechanism. With this characteristic, when the shutter is open, full light is incident on the photovoltaic cells below and a high voltage is generated. On the other hand, when the shutter is closed, less light is generated on the related photovoltaic cells and a lower voltage is generated. By utilizing this phenomenon with appropriate electrical circuit arrangements, the operational state of a display segment can be detected.

Still referring to FIGS. 2A and 2B, an example is described to explain the operation of the present invention. As is shown in the figures, and for purposes of discussion, a geometric pattern is formed from a plurality of independent display segments. Furthermore, it is assumed that numeral "3" is to be displayed. A controller (to be described subsequently) generates electrical signals for driving segments 36 and 38, respectively. The electrical signals for driving these segments are supplied to leads 36A and 38A, respectively. Simultaneously, no drive signal is applied to the other five segments of the segmented geometric pattern. By energizing segments 36 and 38, these segments are transparent while the other five segments are opaque. Ambient light passes through the transparent segments 36 and 38 to strike the photovoltaic cells therebeneath, and an observer sees the dark color of the cells. The opaque segments appear frosty white to an observer so that a light number appears on a dark background.

When light strikes the photovoltaic cells, power is generated and outputted from the photovoltaic cells. As will be explained subsequently, the power signals are used to indicate the state of the display segments and the remaining power is used in the other circuitry of the shelf label. The opaque segments block the light from the photovoltaic cells and they do not produce power. Thus, by monitoring the electrical signal (i.e., power outputted) from the photovoltaic cells any failure in connections to the segments or failure in the display chemistry will be detected.

Figure 3:
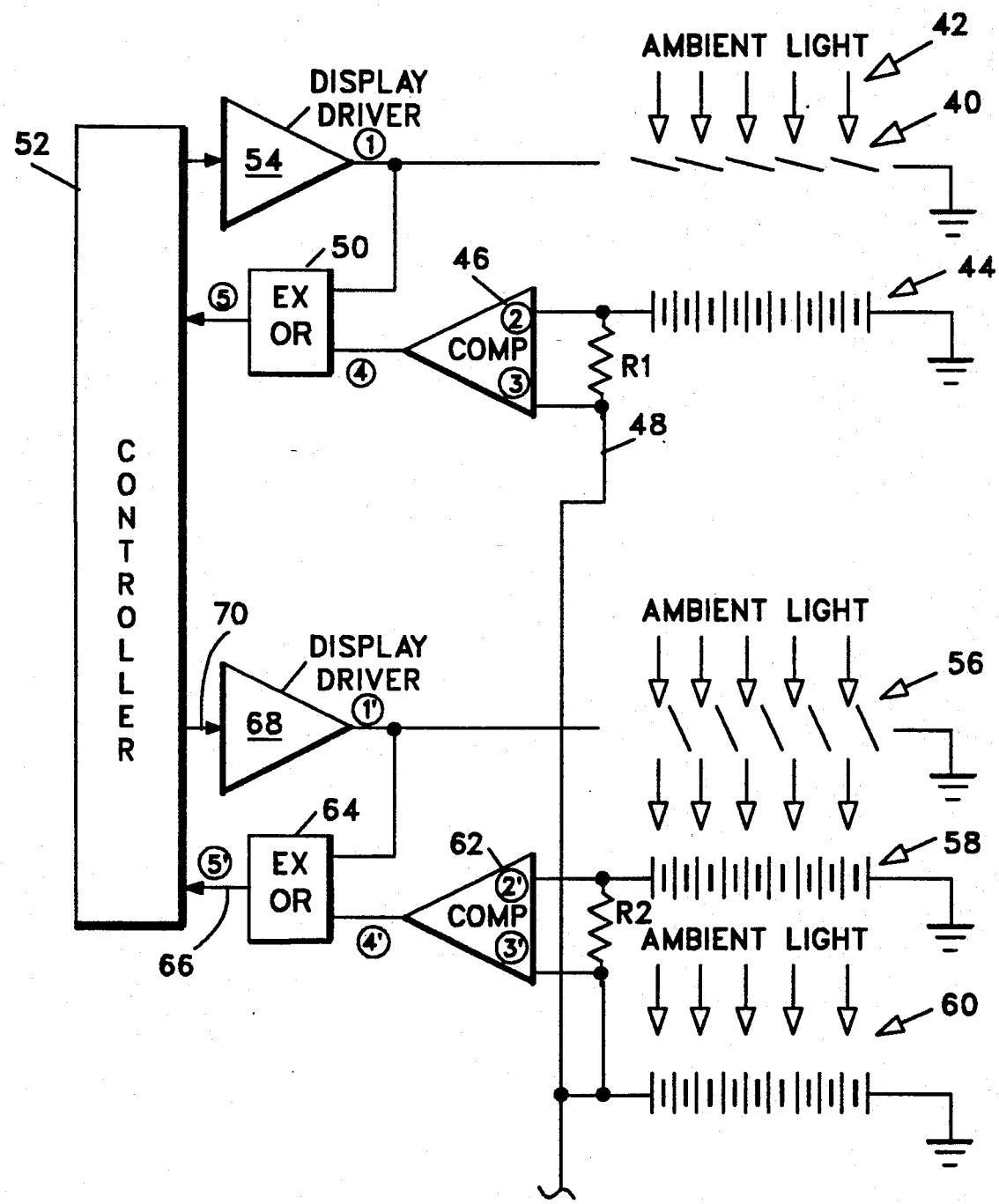
FIG. 3 shows a circuit diagram which monitors the display segment.

FIG. 3 shows a circuit diagram which drives two segments of the display and detects malfunctioning of the segments. Similar circuits can be used for detecting and driving the other segments in the display. As stated above, the LCD film behaves like a shutter mechanism and is represented by slant lines identified by numeral 40. It should be noted that the five slant lines represent the one segment in FIG. 2A that block light from being incident on the photovoltaic cell beneath the segment.

The ambient light in FIG. 3 is represented by vertical arrows 42. With no voltage applied to the segments, the shutter is closed and little power is generated from the photovoltaic cells beneath these opaque segments. In contrast, a non-shaded photovoltaic cell beneath a segment which is passing light outputs a voltage identified by numeral 44. By way of example, the signal from such a cell could have the numerical value of 0.5V at approximately 1 microamp. The output from the cell is fed into one terminal of comparator 46 while the other terminal of comparator 46 is connected to a common lead 48. A resistor R1 is connected across the input to comparator 46. The output from comparator 46 is connected to one input of exclusive OR circuit 50 while the output of the exclusive OR circuit 50 indicates a good segment signal and is fed into controller 52. Similarly, the output from controller 52 is fed over a conductor into display driver 54.

Still referring to FIG. 3, the lower portion of the figure indicates a condition where the segment is energized so as to allow ambient light to pass through shutter segment 56 to generate a voltage indicated by numeral 58. The photovoltaic segment cell which generates voltage 58 is positioned below the respective segment. Also, voltage source 60 indicates a voltage generated by photovoltaic cells positioned below the non-segmented section of the liquid crystal film. As stated above, these photoelectric cells generate continuous power. The voltage which is generated by photovoltaic cell 58 is connected to one input of comparator 62. The voltage 60 which is outputted from photovoltaic cells not under a display segment is connected to common lead 48 and another input of comparator 62. A resistor R2 is connected across the input to comparator 62. The output from comparator 62 is fed into one terminal of exclusive OR circuit 64. The other input to XOR circuit 64 is the signal used to drive the display segment. The output from the exclusive OR circuit is fed over conductor 66 into controller 52. Signals for driving the segments 56 are provided by display driver 68. Conductor 70 interconnects the input of display driver 68 to controller 52. In the preferred embodiment of this invention controller 52 may be a programmed microprocessor or combinatorial logic circuit. The design of an appropriate combinatorial circuit arrangement and/or a program for driving a conventional microcontroller is well known within the skill of one skilled in the art. Therefore, a detailed discussion and description of said configuration will not be given.

Still referring to FIG. 3, in operation the top display segment has no voltage applied to it. As a result, very little light reaches the photovoltaic cell beneath it and very little power is generated. Thus, there is almost no voltage drop across R1 (signals 2 and 3). Signals 1 and 4 would be identical and a good segment signal is generated at 5 and sent to the microcontroller. If the segment or its connection was defective, the signal at 1 and 4 would be different and a not-good segment signal would be transmitted to the controller. The controller could then generate a signal to blink the defective segment, sound an alarm, or shut down the display.

Still referring to FIG. 3, the lower display segment shows that the display driver 68 outputs a voltage (+3V) on a segment. The segment is transparent and its photovoltaic cell generates power which causes enough voltage difference between signal points 2' and 3' to cause a signal to be outputted at 4'. The signal at 4' is high and identical to the signal at 1'. As a result, a good segment signal is generated at 5' and transmitted over conductor 66 to controller 52. As discussed above, if a segment or its connection is defective, the signal at 1' and 4' would be different and a not-good segment signal would be outputted at 5'. This concludes the detailed description of the invention.

While the invention has been particularly shown and described with reference to the preferred embodiment thereof, it will be understood that various changes of form and details may be made therein without departing from the spirit and scope of the invention.

I claim:
1. A device for displaying information comprising:
    a liquid-crystal display (LCD) means, said display means carrying a plurality of display segments which are grouped to form desired shapes and/or alphanumeric characters;
    a support means coupled to the LCD means, said support means providing photovoltaic conversion from light passing through said LCD means and having a plurality of photovoltaic segments thereon, with said segments being arranged into shapes and/or alphanumeric characters which are similar to those on the LCD means; and
    control means coupled to the liquid crystal display (LCD) means and the support means; said control means monitoring the support means to detect electrical signals generated as a result of light transmitted through the liquid crystal display means and using said electrical signals to generate error signals representative of malfunctioning display segments.

2. The device of claim 1 further including a printed circuit board for supporting components of claim 1; said circuit board receiving electrical power from the support means.

3. The device of claim 2 further including a housing having a back cover and a front cover, with a window section to view the display segment, for encasing the printed circuit board, the support means and the liquid crystal display means.

4. The device of claim 1 wherein the support means includes a plurality of photovoltaic cells;
   a plurality of photovoltaic lead, one of each connected to selected ones of the plurality of photovoltaic cells; and
   a common photovoltaic lead connected to selected ones of the plurality of photovoltaic cells.

5. The device of claim 1 wherein the liquid-crystal display means includes a liquid-crystal film.

6. The device of claim 1 wherein the LCD includes a nematic liquid trapped between conductor-carrying support members.

7. The device of claim 1 wherein the control means includes a controller;
   a display driver means generating drive signals which energize the display segments in response to control signals outputted by the controller;
   a first circuit means for generating output signals representative of voltages generated by selected ones of the photovoltaic segments; and
   a second circuit means for correlating selected ones of the drive signals with selected ones of the output signals to generate the error signals.

8. The device of claim 7 wherein the controller includes a microprocessor.

9. The device of claim 7 wherein the first circuit means includes comparator circuits.

10. The device of claim 7 wherein the second circuit means includes EX OR circuits.

11. An improved electronic shelf label system comprising:
    a display subsystem;
    said display subsystem having a liquid crystal display means on which at least one multisegment alphanumeric character is formed;
    at least a first photovoltaic cell positioned to receive light transmitted through at least one segment of the multi-segment alphanumeric character and to generate at least a first electrical signal therefrom;
    at least a second photovoltaic cell positioned to receive light transmitted through non-segmented areas of said display subsystem and to generate and output a second electrical signal representative of said light;
    a first circuit means for generating and applying electrical drive signals to selected segments of said multi-segment alphanumeric character;
    a second circuit means for correlating the first electrical signal with the second electrical signal to generate and output a resultant signal; and
    a third circuit means responsive to the electrical drive signals and the resultant signal to generate an error signal representative of malfunctioning segments.

12. The improved electronic shelf label of claim 11 wherein the liquid crystal display means includes liquid crystal film.

13. The improved electronic shelf label system of claim 12 wherein the first means includes a display driver circuit.

14. The improved electronic shelf label system of claim 13 wherein the second circuit means includes a comparator circuit.

15. The improved electronic shelf label system of claim 14 wherein the third circuit means includes an EX OR circuit.

* * * * *